Dec. 30, 1952     J. R. ANDREWS     2,623,491
DEVICE FOR SIGNALING PROPER POSITION OF AUTOMOBILE JACKS
Filed July 9, 1949

INVENTOR.
JOHN R. ANDREWS
BY
Chas. T. Hawley
Atty.

Patented Dec. 30, 1952

2,623,491

UNITED STATES PATENT OFFICE 2,623,491

DEVICE FOR SIGNALING PROPER POSITION OF AUTOMOBILE JACKS

John R. Andrews, Uxbridge, Mass.

Application July 9, 1949, Serial No. 103,763

1 Claim. (Cl. 116—67)

This invention relates to lifting jacks of the type used in changing tires on automobiles.

It is the general object of the invention to provide a signal device by which the jack may be more easily positioned under an automobile, where it often cannot be easily observed.

To the accomplishment of this general object, I provide an audible signal, such as a bell, and arrange for the signal to be sounded when the jack is directly under the wheel axle casing.

A further object is to provide a combined jack and signal device which may be placed either in front of or behind the wheel to be lifted, after which the wheel is moved into alignment with the jack, so that the axle is positioned directly over the jack with the wheel resting on a plate to which the jack is attached or which may be an integral part of the jack. The wheel rests on this plate holding the jack in place without letting the jack slip or get out of alignment while the wheel is being raised.

My invention further relates to arrangements and combinations of parts which will be hereinafter described and more particularly pointed out in the appended claim.

A preferred form of the invention is shown in the drawings, in which.

Figure 3:
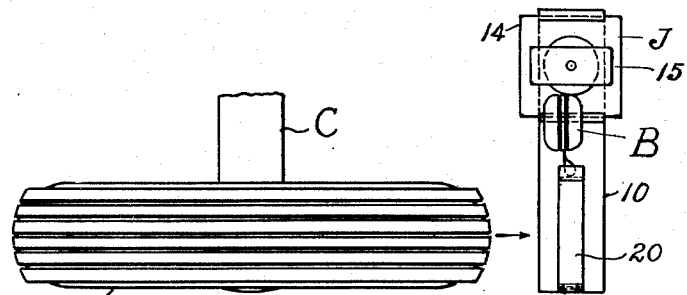
Fig. 3 is a plan view showing the method of use of the device.

Referring to the drawings, my invention as shown comprises a base plate 10 having cross bars 11 and 12 which receive and position the base 14 of a lifting jack J. The jack has a cap 15 (Fig. 3) to engage the axle casing C of a rear wheel W or the axle of a front wheel.

The jack J may be of any usual and suitable type and the base 14 may be integral with the plate 10 if so desired. The details of construction of the jack form no part of the invention.

The signal device comprises a treadle 20 hinged at 21 to the base plate 10. The treadle 20 has an upstanding portion 24 with an end flange 25.

Figure 1:
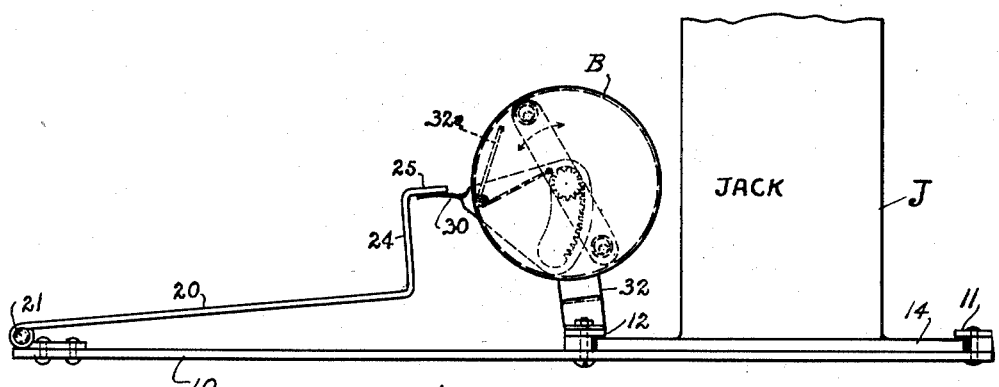
Fig. 1 is a side elevation of my improved signal device.
Figure 2:
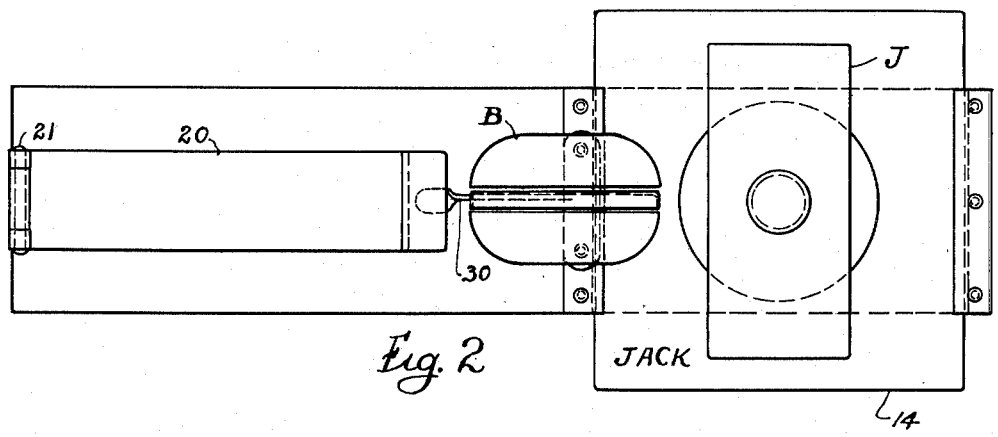
Fig. 2 is a plan view thereof.

The flange 25 overlies the operating lever 30 of a bell B which is mounted on a fixed bracket 32 (Fig. 1). The bell B may conveniently be of the ordinary bicycle type which is operated by depressing the lever 30, and which has a spring 32a for upward return of the lever and treadle.

Having described the details of construction of my invention, the method of use is as follows:

The base plate 10 and associated jack and signal device is placed on the ground in the path of the wheel W and with the cap 15 in line with the casing C, or other portion of an axle to which a jack may be applied to raise an automobile wheel. The car is then moved toward the device until the wheel W depresses the treadle 20 and thus rings the bell.

When the bell rings, the car is abruptly stopped, and the casing C, or other portion of an axle to which a jack may be applied to raise an automobile wheel, will be found correctly centered over the cap 15. The position of the car may be checked by determining whether the treadle 20 is directly below the center of the wheel W.

It is thus possible to quickly position a jack in an obscured position, and the positioning can be quickly done by the driver of the car and without outside assistance.

Having thus described my invention and the advantages thereof, I do not wish to be limited to the details herein disclosed, otherwise than as set forth in the claim, but what I claim is:

A jack positioning and signalling device comprising a base plate associated with an auto jack and effective to hold said auto jack in load-engaging position when the jack is to be operated, said base plate extending a substantial distance outward from said jack and transversely of the path of travel of the auto wheel to be lifted, a treadle hinged to the outer end of said base plate and extending toward the jack along and above said base plate and transversely into said path of travel of said wheel, yielding means to hold the free inner end of said treadle substantially raised from said base plate, said base plate, jack and treadle being positioned in a vertical plane substantially perpendicular to the side face of the wheel to be lifted and thereby positioning the jack directly and vertically under the wheel axle when the treadle is centered below a wheel resting thereon, a signal device, and an operating connection between said treadle and said signal device, said treadle being normally raised but being depressed as a wheel is moved to centered position over said treadle to rest thereon and before said wheel is raised, and said treadle being effective by its downward swinging movement and through said operating connection to sound said signal when said treadle is thus depressed by said wheel.

JOHN R. ANDREWS.

REFERENCES CITED

The following references are of record in the file of this patent:

UNITED STATES PATENTS

| Number | Name | Date |
|---|---|---|
| 2,053,646 | Whalen | Sept. 8, 1936 |
| 2,411,803 | Parrott | Nov. 26, 1946 |